United States Patent [19]

Ogilvie et al.

[11] 3,959,806

[45] May 25, 1976

[54] WATER SUPPLY APPARATUS FOR PRINTING MACHINES

[75] Inventors: Samuel P. Ogilvie; Lorne F. Bolton; Charles W. Dingman, all of Stratford, Canada

[73] Assignee: The Beacon Herald of Stratford, Limited, Stratford, Canada

[22] Filed: Sept. 13, 1974

[21] Appl. No.: 505,892

Related U.S. Application Data

[63] Continuation of Ser. No. 312,552, Dec. 6, 1972, abandoned.

[30] Foreign Application Priority Data

Oct. 3, 1972 Canada .............................. 153101

[52] U.S. Cl. ................................ 354/297; 354/318

[51] Int. Cl.[2] ........................................ G03B 13/00

[58] Field of Search ............................ 354/318, 297

[56] References Cited

UNITED STATES PATENTS 2,605,684 8/1952 Nagels .............................. 354/318

2,688,281 9/1954 Bornemann ........................ 354/318

*Primary Examiner*—John M. Horan

*Attorney, Agent, or Firm*—Ladas, Parry, Von Gehr, Goldsmith & Deschamps

[57] ABSTRACT

Water supply apparatus for a lithographic printing machine includes a main frame having two laterally spaced main frame members, and a sub-frame having two laterally spaced sub-frame members each pivotally mounted on a respective main frame member. A laterally extending water transfer roller is rotatably mounted between the main frame members, a laterally extending water pick up roller is rotatably mounted between the sub-frame members, and a laterally extending pressure roller is rotatably mounted between the sub-frame members and in contact with the pick up roller, which projects into a water tray. The sub-frame can be pivoted to position the pick up roller in or out of contact with the transfer roller, and the main frame is attachable to a printing machine to enable water to be transferred from the transfer roller to a lithographic printing plate.

12 Claims, 5 Drawing Figures

WATER SUPPLY APPARATUS FOR PRINTING MACHINES

This is a continuation of application Ser. No. 312,552 filed Dec. 6, 1972, now abandoned. This invention relates to water supply apparatus for printing machines, and more particularly to water supply apparatus which can be secured to a letter press printing machine to convert it to a lithographic printing machine.

Many printing establishments, for example newspaper printers, have letter press printing machines in which the paper is printed from a stereo printing plate mounted on a revolving cylinder, the high areas of the printing plate picking up ink from an inking mechanism and transferring the ink image to the newspaper.

In a lithographic printing machine, the printing plate is plane, and is supplied with ink and water. The image on the plate is produced in such a manner, usually by a photographic process, that certain areas of the plate pick up ink and repel water, and other areas pick up water which repels the ink. It is necessary to apply the water in a thin even film in controlled amounts.

It is accordingly an object of the invention to provide a water supply apparatus which can be attached to an existing letter press machine to convert it to a lithographic printing machine, thereby improving the quality of the printing without incurring the expense of a completely new machine.

According to the invention, water supply apparatus includes a main frame having two laterally spaced main frame members, a sub-frame having two laterally spaced sub-frame members each pivotally mounted on a respective main frame member, a laterally extending water transfer roller rotatably mounted between the main frame members, a water pick up member rotatably mounted between the sub-frame members, a pressure roller rotatably mounted between the sub-frame members and in contact with the pick up roller, a water tray into which the pick up roller projects, and a means for pivoting the sub-frame to put the pick up roller into or out of contact with the transfer roller, the main frame being attachable to a letter press machine to enable water to be transferred from the transfer roller to a lithographic printing plate secured to the printing machine.

The means for pivoting the sub-frame may include electromagnetic means connected between the sub-frame and the main frame and controlled in dependence upon the speed of the machine. Alternatively, the pivoting means may include cam means rotated by the machine and acting upon a cam follower carried by the sub-frame to effect pivotal movement thereof.

Figure 1:
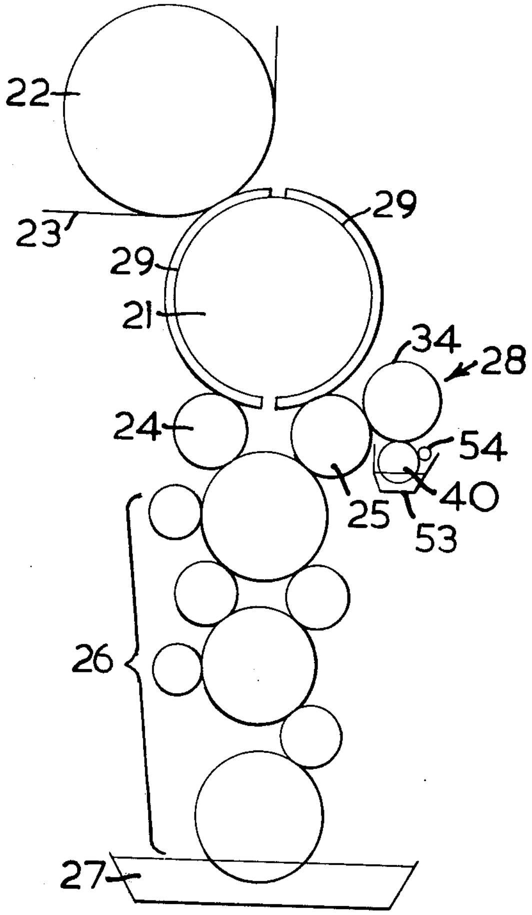
Figure 2:
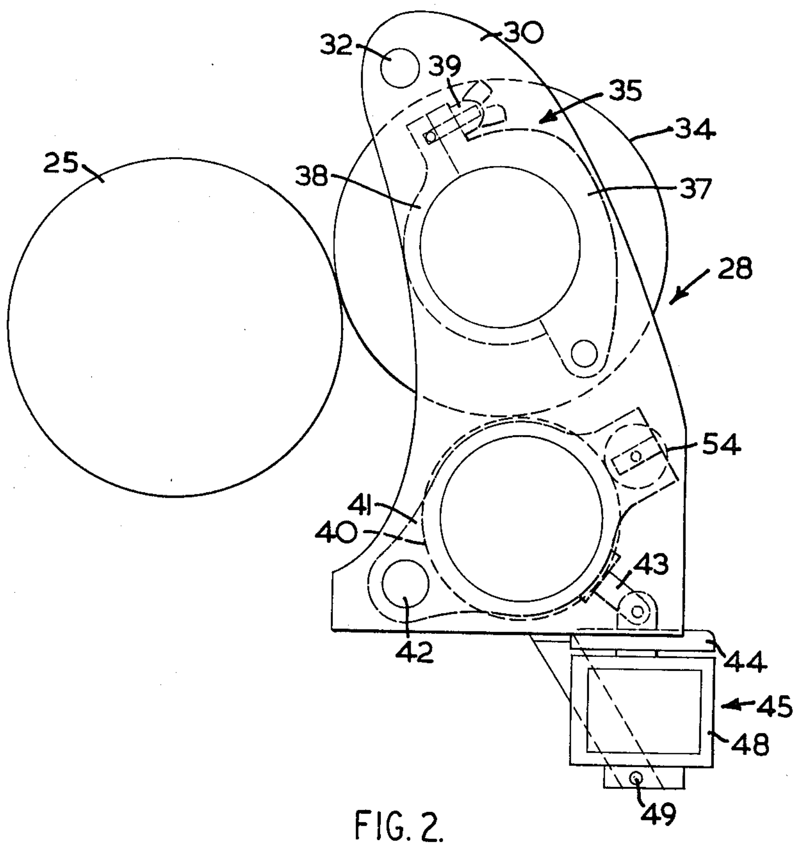
Figure 3:
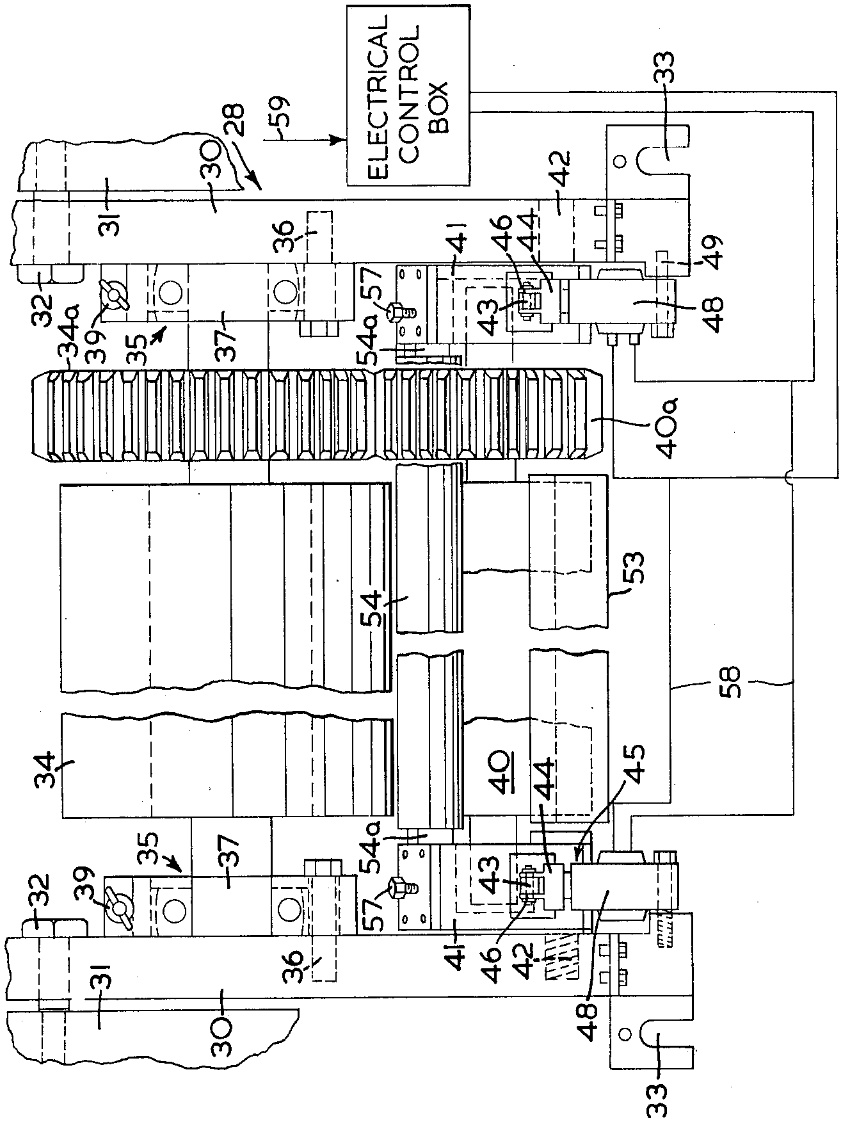
Figure 4:
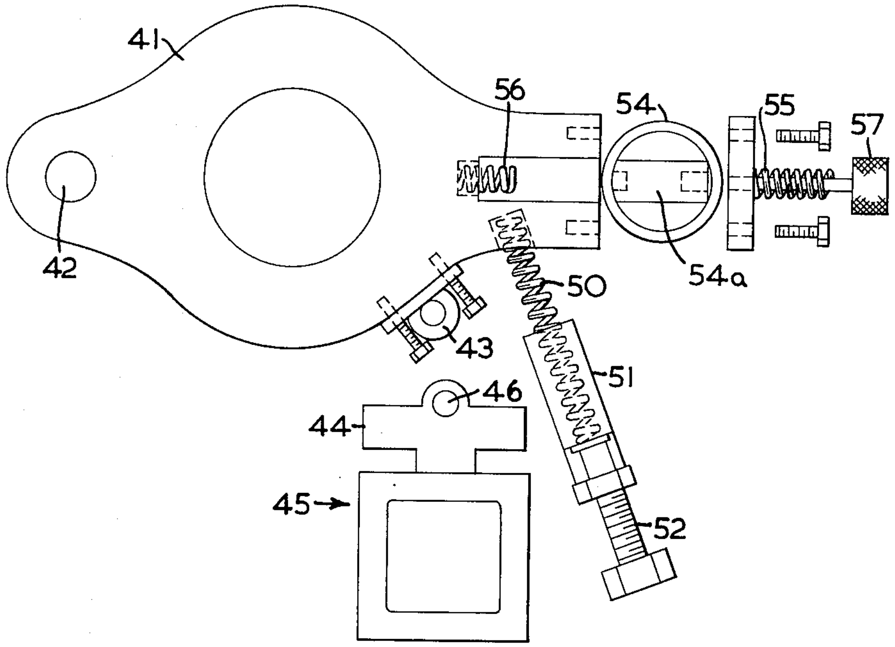
Figure 5:
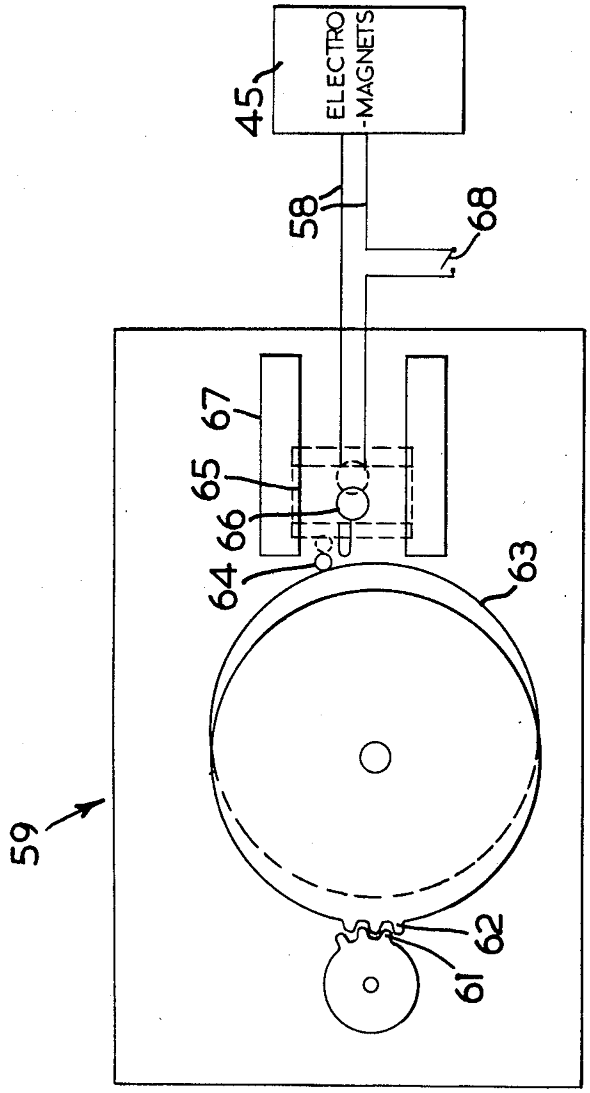

One embodiment of the invention will now be described, by way of example, with reference to the accompanying drawings, of which:

FIG. 1 is a diagrammatic side view of a letter press printing machine to which a water supply apparatus according to the invention has been attached to convert the machine to a lithographic printing machine, FIG. 2 is a side view of the water supply apparatus, FIG. 3 is a front view of the water supply apparatus, FIG. 4 is an exploded diagrammatic view of various parts of the water supply apparatus, and FIG. 5 is a diagrammatic view of a control box.

Referring to the accompanying drawings, FIG. 1 shows a basic letter press newspaper printing machine with a plate cylinder 21, which in use of the machine as a letter press will carry two arcuate stereo printing plates. A blanket cylinder 22 rotates in engagement with the plate cylinder 21, and the newspaper web 23 passes between the plate cylinder 21 and the blanket cylinder 22. Two ink form rollers 24, 25 contact the bottom of the plate cylinder 21, and these are inked by a series of ink rollers indicated generally at 26, the lowermost ink roller projecting into an ink fountain 27.

The basic letter press machine is converted into a lithographic machine by attachment of water supply apparatus 28 to the frame of the machine, so as to supply a film of water to one of the ink form rollers 24, 25, in this case the roller 25. Also, the stereo printing plates are replaced by lithographic printing plates 29.

The water supply apparatus includes a main frame having two laterally spaced main frame members 30 secured to appropriate parts of the frame 31 of the machine. The upper end of each main frame member 30 is secured to the machine frame 31 by a bolt 32, and the lower end of each frame member 30 is secured to the machine frame 31 by a bolt (not shown) which is positioned in an open ended slot 33 in the main frame member 30 to enable the angular position of the water supply apparatus to be adjusted.

A water transfer roller 34 is rotatably mounted between upper portions of the main frame members 30, the roller 34 having shafts mounted in self-centering bearings 35 secured to the main frame members 30 by bolts 36. Each bearing 35 has one part 37 pivotally secured to another part 38 by a threaded rod and wing nut fastening 39. By loosening each wing nut, the fastenings 39 can be released to enable the transfer roller 34 to be removed or replaced. The water transfer roller 34 is urethane covered.

A water pick up roller 40 is rotatably mounted below the transfer roller 34 in a sub-frame having sub-frame members 41, which are pivotally secured to the main frame members 30 by bolts 42. The pick up roller 40 has shafts mounted in self-centering bearings carried by the sub-frame members 41. Each sub-frame member 41 has a downwardly projecting lug 43 to which the upper part 44 of an electromagnet 45 is pivotally secured by a pin 46. The main lower body part 48 of each electromagnet 45 is pivotally secured to the adjacent main frame member 30 by a pin 49. A compression spring 50 acts at its upper end on the lower side of each sub-frame member 41 to urge the pick up roller 40 in an angularly upward direction against the transfer roller 34. The lower end of each spring 50 is carried by a sleeve 51 secured to the adjacent main frame member 30, and the sleeve 51 carries an adjustment screw 52 to enable the force exerted by the spring 50 to be varied.

The lower portion of the pick up roller 40 projects into water in a water tray 53 which is secured in any convenient manner between the main frame members 30. The pick up roller 40 is a chrome covered roller.

The sub-frame members 41 also carry a rotatable pressure roller 54 which is resiliently urged against the pick up roller 40. Each sub-frame member 41 contains springs 55, 56 acting in opposite directions on stub-shafts 54a at each end of the pressure roller 54 located in slots in the respective sub-frame member 41, to provide a resilient mounting. The force exerted by each pair of springs 55, 56 is adjustable by a screw 57. The pressure roller 54 is a steel roller with a fabric sleeve covering.

The electromagnets 45 are electrically connected by wires 58 to a control box 59. When the electromagnets 45 are actuated, the sub-frame members 41 are pulled downwardly to separate pick up roller 40 from the transfer roller 34. When the electromagnets 45 are not actuated, the springs 50 resiliently urge the pick up roller 40 against the transfer roller 34.

In use of the machine as a lithographic printing machine, the lithographic plates 29 and the water supply apparatus 28 are attached. The printing plates 29 receive ink from the ink fountain 27 via the series of ink rollers 26 and the ink form rollers 24, 25. The plates 29 also receive water from the water tray 53 of the water supply apparatus 28 via the pick up roller 40, the transfer roller 34 and the form roller 25. The transfer roller 34 is driven by friction from the form roller 25, which is gear driven in the same way as when the machine is used as a letter press machine. The pick up roller 40 is gear driven from the transfer roller 34 by intermeshing gears 34*a*, 40*a* carried by the pick up roller 40 and the transfer roller 34 respectively. The gear teeth of gears 34*a*, 40*a* are sufficiently long to still inter-mesh with one another when the pick up roller 40 is separated from the transfer roller 34 by actuation of the electromagnets 45.

Water picked up from the tray 53 is spread into a thin even film by the pressure roller 34, the thickness of the film being adjustable by operation of the adjustment screw 57. The film of water on the pick up roller 40 is transferred to the transfer roller 34 which in turn transfers a thin film of water to the form roller 25, which of course also carries ink. The ink and water on the form roller 25 are then transferred to the lithographic plates 29, which subsequently prints the newspaper web 23.

The amount of water on the transfer roller 34 is controlled in two ways. The first is by adjustment of the adjustment screws 57 associated with the pressure roller 54, as previously described. Secondly, the pick up roller 40 is rocked to and fro, into and out of contact with the transfer roller 34, by intermittent operation of the electromagnets 45, this being controlled by the control box 59. The control box 59 contains a cam mechanism mechanically linked to the machine, and it is adjustable so that the period of actuation of the electromagnets 45 can be varied from continuous actuation to periodic actuation for variable predetermined portions of the machine cycle. Thus the frequency with which the pick up roller 40 rocks back and forth depends upon the speed of the machine. The control box 59 can be adjusted while the machine is running. For example, the arrangement may be such that the electromagnets 45 are actuated once for every two or for every four revolutions of the machine.

FIG. 5 shows one example of control box 59. A gear 61 driven by the printing machine drives a further gear 62 carrying an eccentric cam As the cam 63 rotates, it moves a flexible arm 64 to actuate a micro-switch 65 in the circuit of electromagnets 45. Actuation of the micro-switch 65 results in actuation of the electromagnets 45 with constant separation of the pick up roller 40 from the transfer roller 34.

The micro-switch 65 is slidably mounted on slides 67, and its position can be adjusted by loosening a locking nut 66. Moving the micro-switch 65 closer to the cam 63 results in the electromagnets 45 being actuated for a greater proportion of revolution of the cam 63. It is thus possible to adjust the micro-switch 65 from the point where it is actuated all the time to the point where it is not actuated at all during revolution of the cam 63. The actual gearing of course determines the number of times the electromagnets 45 are actuated per revolution of the machine.

The electrical wiring 58 includes a switch 68 which can open the circuits to the electromagnets 45 so they are not actuated. The switch 68 is used during start up time when a greater amount of water is required to wash up the plates in a short time, thus reducing the printing waste. Once the plates have been cleaned up, the circuit is restored and the micro-switch begins to actuate the electromagnets depending upon the speed of the printing machine.

We claim:

1. Water supply apparatus for a lithographic printing machine including a main frame having two laterally spaced main frame members, a sub-frame having two laterally spaced sub-frame members each pivotally mounted on a respective main frame member, a laterally extending water transfer roller rotatably mounted between the main frame members, a laterally extending water pick up roller rotatably mounted between the sub-frame members, a first gear secured to the transfer roller, a second gear secured to the pick-up roller, the second gear meshing with the first gear whereby rotation of the transfer roller causes rotation of the pick-up roller, a laterally extending pressure roller rotatably mounted between the sub-frame members and in contact with the pick up roller, the pressure roller being rotatable by the pick-up roller, a water tray into which the pick up roller projects, and means for pivoting the sub-frame to position the pick up roller in or out of contact with the transfer roller, the first and second gears having teeth sufficiently long to ensure that the first gear meshes with the second gear whether the pick-up roller is in or out of contact with the transfer roller so that the pick-up roller and the pressure roller rotate continuously with rotation of the transfer roller, the main frame being attachable to a printing machine to cause engagement of the transfer roller with a roller of the printing machine to cause rotation of the transfer roller by rotation of the printing machine roller to enable water to be transferred from the transfer roller to a lighographic printing plate.

2. Water supply apparatus for a lithographic printing machine including a main frame having two laterally spaced main frame members, a sub-frame having two laterally spaced sub-frame members each pivotally mounted on a respective main frame member, a laterally extending water transfer roller rotatably mounted between the main frame members, a laterally extending water pick up roller rotatably mounted between the sub-frame members, a laterally extending pressure roller rotatably mounted between the sub-frame members and in contact with the pick up roller, a water tray into which the pick up roller projects, and means for pivoting the sub-frame to position the pick up roller in or out of contact with the transfer roller, said means for pivoting the sub-frame including electromagnetic means connected between the sub-frame and the main frame, the main frame being attachable to a printing machine to enable water to be transferred from the transfer roller to a lithographic printing plate.

3. Water supply apparatus according to claim 2 wherein the subframe is resiliently urged to a position in which the pick up roller contacts the transfer roller, and the electromagnetic means is operable to pivot the sub-frame to separate the pick up roller from the transfer roller.

4. Water supply apparatus according to claim 2 wherein the electromagnetic means is connected to switching means arranged to energize said electromagnetic means intermittently on a regular cycle to continually make and break the contact between the pick up roller and the transfer roller such that the period of contact varies with the speed of the machine.

5. A lighographic printing machine including water supply apparatus having a main frame with two laterally spaced main frame members, a sub-frame having two laterally spaced sub-frame members each pivotally mounted on a respective main frame member, a laterally extending water transfer roller rotatably mounted between the main frame members, a laterally extending water pick up roller rotatably mounted between the sub-frame members, a first gear secured to the transfer roller, a second gear secured to the pick-up roller, the second gear meshing with the first gear whereby rotation of the transfer roller causes rotation of the pick-up roller, a laterally extending pressure roller rotatably mounted between the sub-frame members in contact with the pick up roller, the pressure roller being rotatable by the pick-up roller, a water tray into which the pick up roller projects, and means for pivoting the sub-frame to position the pick up roller in or out of contact with the transfer roller, the first and second gears having teeth sufficiently long to ensure that the first gear meshes with the second gear whether the pick-up roller is in or out of contact with the transfer roller so that the pick-up roller and the pressure roller rotate continuously with rotation of the transfer roller, the main frame being secured to the printing machine to cause engagement of the transfer roller with a roller of the printing machine to cause rotation of the transfer roller by rotation of the printing machine roller to enable water to be transferred from the transfer roller to a lithographic printing plate.

6. A lithographic printing machine including water supply apparatus having a main frame with two laterally spaced main frame members, a sub-frame having two laterally spaced subframe members each pivotally mounted on a respective main frame member, a laterally extending water transfer roller rotatably mounted between the main frame members, a laterally extending water pick up roller rotatably mounted between the sub-frame members, a laterally extending pressure roller rotatably mounted between the sub-frame members in contact with the pick up roller, a water tray into which the pick up roller projects, and means for pivoting the sub-frame to position the pick up roller in or out of contact with the transfer roller, said means for pivoting the sub-frame includes electromagnetic means connected between the sub-frame and the main frame, the main frame being secured to the printing machine to enable water to be transferred from the transfer roller to a lithographic printing plate.

7. A lithographic printing machine according to claim 6 wherein the sub-frame is resiliently urged to a position in which the pick up roller contacts the transfer roller, and the electromagnetic means is operable to pivot the sub-frame to separate the pick up roller from the transfer roller.

8. A lithographic printing machine according to claim 6 wherein the electromagnetic means is connected to switching means arranged to energize said electromagnetic means intermittently on a regular cycle to continually make and break the contact between the pick up roller and the transfer roller such that the period of contact varies with the speed of the machine.

9. A lithographic printing machine according to claim 5 wherein the transfer roller is in contact with an inking roller forming part of an inking mechanism supplying ink from an ink supply to the printing plate.

10. Water supply apparatus for a lithographic printing machine including a main frame having two laterally spaced main frame members, a sub-frame having two laterally spaced sub-frame members each pivotally mounted on a respective main frame member, a laterally extending water transfer roller rotatably mounted between the main frame members, a laterally extending water pickup roller rotatably mounted between the sub-frame members, a first gear secured to the transfer roller, a second gear secured to the pickup roller, the second gear meshing with the first gear whereby rotation of the transfer roller causes rotation of the pickup roller, a laterally extending pressure roller rotatably mounted between the sub-frame members and in contact with the pickup roller, the pressure roller being rotatable by the pickup roller, a water tray into which the pickup roller projects, and electromagnetic means for pivoting the sub-frame to position the pickup roller in or out of contact with the transfer roller, said electromagnetic means being connected to switching means arranged to energize said electromagnetic means intermittently on a regular cycle to continually make and break the contact between the pickup roller and the transfer roller such that the period of contact varies with the speed of the machine, the first and second gears having teeth sufficiently long to ensure that the first gear meshes with the second gear whether the pickup roller is in or out of contact with the transfer roller so that the pickup roller and the pressure roller rotate continuously with rotation of the transfer roller, the main frame being attachable to a printing machine to cause engagement of the transfer roller with a roller of the printing machine to cause rotation of the transfer roller by rotation of the printing machine roller to enable water to be transferred from the transfer roller to a roller of the printing machine.

11. A lithographic printing machine including water supply apparatus having a main frame with two laterally spaced main frame members, a sub-frame having two laterally spaced sub-frame members each pivotally mounted on a respective main frame member, a laterally extending water transfer roller rotatably mounted between the main frame members, a laterally extending water pickup roller rotatably mounted between the sub-frame members, a first gear secured to the transfer roller, a second gear secured to the pickup roller, the second gear meshing with the first gear whereby rotation of the transfer roller causes rotation of the pickup roller, a laterally extending pressure roller rotatably mounted between the sub-frame members in contact with the pickup roller, the pressure roller being rotatable by the pickup roller, a water tray into which the pickup roller projects, and electromagnetic means for pivoting the sub-frame to position the pickup roller in or out of contact with the transfer roller, said electromagnetic means being connected to switching means arranged to energize said electromagnetic means intermittently on a regular cycle to continually make and break the contact between the pickup roller and the transfer roller such that the period of contact varies with the speed of the machine, the first and second gears having teeth sufficiently long to ensure that the first gear meshes with the second gear whether the pickup roller is in or out of contact with the transfer roller so that the pickup roller and the pressure roller rotate continuously with rotation of the transfer roller, the main frame being secured to the printing machine to cause engagement of the transfer roller with a roller of the printing machine to cause rotation of the transfer roller by rotation of the printing machine roller to enable water to be transferred from the transfer roller to a roller of the printing machine.

12. A lithographic printing machine according to claim 11, wherein said switching means includes a cam rotatably connected to printing rollers of said machine, and a micro-switch operated by a cam follower cooperating with said cam, said micro-switch being adjustable to vary the instant of operation thereof by the cam follower relative to the rotational position of the cam.

* * * * *